United States Patent [19]

Ford

[11] E Re. 29,561

[45] Reissued Mar. 7, 1978

[54] FUEL INJECTION SYSTEMS FOR INTERNAL COMBUSTION ENGINES

[75] Inventor: Eric H. Ford, London, England

[73] Assignee: Lumenition, Ltd., London, England

[21] Appl. No.: 745,096

[22] Filed: Nov. 26, 1976

Related U.S. Patent Documents

Reissue of:

[64] Patent No.: 3,851,628
Issued: Dec. 3, 1974
Appl. No.: 874,470
Filed: Nov. 6, 1969

[30] Foreign Application Priority Data

Nov. 12, 1968 United Kingdom ..... 53580/68

[51] Int. Cl.[2] ..... F02M 51/00

[52] U.S. Cl. ..... 123/32 EA; 123/140 MC; 123/119 R; 123/32 AE

[58] Field of Search ..... 123/32 R, 32 EA, 32 AE, 123/32 EF, 146.5 A, 140 MC

[56] References Cited

U.S. PATENT DOCUMENTS

| | | | |
|---|---|---|---|
| 1,705,665 | 3/1929 | French | 123/32 |
| 3,020,897 | 2/1962 | Sekine | 123/32 EA |
| 3,076,447 | 2/1963 | Knudson | 123/32 AE |
| 3,203,410 | 8/1965 | Scholl | 123/32 EA |
| 3,235,742 | 2/1966 | Peters | 123/148 E |
| 3,272,187 | 9/1966 | Westbrook et al. | 123/32 EA |
| 3,386,000 | 5/1968 | Farr | 123/148 E |
| 3,390,668 | 7/1968 | Hufton | 123/148 E |
| 3,405,268 | 10/1968 | Brunton | 250/83.3 IR |
| 3,406,672 | 10/1968 | Phillips et al. | 123/148 E |
| 3,422,804 | 1/1969 | Van Mastrigt | 123/148 E |
| 3,462,129 | 8/1968 | Brunton | 250/83.3 IR |
| 3,463,129 | 8/1969 | Babitzka et al. | 123/140 ML |
| 3,473,067 | 10/1969 | Rittmayer | 200/217 SS |
| 3,543,739 | 9/1970 | Mennesson | 123/32 EA |
| 3,587,535 | 6/1971 | Kimberley | 123/146.5 A |
| 3,654,905 | 4/1972 | Mennesson | 123/32 EA |

*Primary Examiner*—Charles J. Myhre
*Assistant Examiner*—Parshotam S. Lall
*Attorney, Agent, or Firm*—Michael, Best & Friedrich

[57] ABSTRACT

A device for generating a voltage pulse for use with a fuel injection system of an internal combustion engine utilizing infra-red radiation source and detector for obtaining a voltage pulse to operate the solenoids of the appropriate fuel injectors in cyclic order, which voltage pulse is timed from shutter means mechanically driven and interposed between the source and detector, the relative angular duration of the voltage pulse determined by the length of unmasking by the shutter, being controlled by the speed of and load on the engine.

20 Claims, 3 Drawing Figures

FUEL INJECTION SYSTEMS FOR INTERNAL COMBUSTION ENGINES

Matter enclosed in heavy brackets [ ] appears in the original patent but forms no part of this reissue specification; matter printed in italics indicates the additions made by reissue.

*FIELD OF THE INVENTION*

The present invention relates to improvements in fuel injection systems for internal combustion engines.

*DESCRIPTION OF THE PRIOR ART*

Fuel injection for internal combustion engines offers several important advantages over the conventional method of carburation. One such fuel injection system, known as the Bosch ECGI-system, employs electromagnetically actuated injection valves and solid state circuitry for the metering of the injected fuel volume. The system is a pulse-timed manifold injection system, whereby the fuel is injected onto the heads of the intake valves by electromagnetically actuated nozzle valves. The quantity of fuel injected into each cylinder is a function of the prevailing operating conditions and is metered by the effective opening period of the nozzle valve. To reduce the number of components, especially in the electronic control unit, it has been found practical to common two injectors on four cylinder engines. The opening pulse for each group of injection valves is initiated by a trigger contact arrangement. One set of contacts generates a pulse for its group once every revolution of the camshaft. The trigger pulse upon closing of its contacts, both provides a current to open the respective group of injection valves and starts a time-delay circuit which in turn de-activates the injectors after a period which is determined by the fuel requirements as computed from the prevailing engine operating conditions.

The time-delay circuit is common for all injector groups, and is switched from one group to the other by the trigger contacts in proper sequence. The electronic control unit receives its information from several sensing elements. The speed is obtained from the incoming triggering pulses. The load factor is measured by an inductive pressure sensor. Full load operation is controlled by a vacuum operated switch, which switches the control unit over for an enriched mixture when the manifold vacuum has dropped below a predetermined level. On deceleration, moreover, the fuel is completely shut off to save fuel and to minimize the emission of unburnt fuel components.

The electronic control unit contains one power amplifier for each group of injection valves and the time determining network. The power amplifiers are activated by the pulses received from the trigger contacts, but only if the time determining circuitry is turned on too. A suitable logic [warrents] *warrants* proper correlation between power amplifier and trigger contacts to exclude unwanted injections which could otherwise be triggered by contact bounce. The core of the time determining network is a monostable multivibrator which is changed from its stable "off" state to the unstable "on" state by the triggering pulses. The "on" period of the multivibrator depends on the inductance of the manifold pressure sensor, but is modulated according to the non-linear requirements of the engine fuel characteristics by a corrective speed circuit.

The electronic control unit contains 220 components including 25 transistors and 35 diodes.

The above described Bosch ECGI-system has the following disadvantages:

a. It relies on a contact breaker to generate the pulses for its operation. It is well known that mechanical contacts are liable to wear and unreliable in precision timing.

b. The electronic control unit is unduly complicated, and contains a large number of electronic components. Therefore, the overall failure rate due to component failure is too high.

c. The determination of the "on" state of the multivibrator which determines the quantity of fuel injected is achieved principally from the prevailing pressure in the manifold, but is modified according to speed. The correct "on" period for the prevailing engine requirements is not easily achieved by the present system.

*Another type of fuel injection system is disclosed in U.S. Pat. No. 3,543,739. This system includes an opto-electronic system incorporating a filament lamp, a photo-cell, a cylindrical shutter provided with a triangular shaped window and an amplifier circuit, the last stage thereof being in series with the solenoid. The amplifier circuit comprises three transistors arranged in cascade so that the emitter electrode of one is connected to the base electrode of the next transistor in cascade. In this arrangement all the transistors of the amplifier either switch on together or switch off together.*

*It is well known that the required switching off of the current through the solenoid causes undesirable transients on the line. Such transients, if they store sufficient energy, can be detrimental to the transistors of an amplifier circuit, unless there is a short-circuit path to ground. Thus, in the case of the amplifier circuit disclosed in U.S. Pat. No. 3,543,739, all the transistors are vulnerable to transient voltages, since they are all non-conductive when the transients are generated at the instant that the solenoid is switched off.*

It is therefore an object of the present invention to obviate partially or wholly some or all of the above mentioned disadvantages.

According to the present invention, there is provided [a] *an opto-electronic* device for [generating a voltage pulse for use with] *fast switching the solenoid of* a fuel injection system of an internal combustion engine including [an infra-red sensitive element] *a photo-transistor sensitive to infra-red radiation* which will *switch on or* generate a voltage pulse when exposed to infra-red radiation *and switch off when the infra-red radiation is cut off*, a source of infra-red radiation, an [opaque] element positioned between [said] *the* infra-red source and [infra-red sensitive element, at least one aperture in said opaque element, and] *the photo-transistor and having one portion which is opaque to the radiation and another portion through which radiation can pass,* means for moving the element in [time] *timed* relation to the engine revolutions, [whereby a pulse for the fuel injection system is generated with synchronism with the engine everytime an aperture permits infra-red radiation to fall on the infra-red radiation sensitive element] *and a switching circuit interconnecting the solenoid and the photo-transistor and including a plurality of transistors interconnected to switch on and off in inverse relation, whereby the transistors, in response to switching of the*

*photo-transistor, switch between on and off conditions and cause alternate energization and de-energization of the solenoid to thereby inject the desired quantity of fuel into a cylinder of the internal combustion engine.*

The [infra-red radiation sensitive element may be a silicon planar photo-transistor, and the] source of infra-red radiation may be a gallium arsenide lamp. In [the] *a* preferred embodiment, the [infra-red radiation sensitive element] *photo-transistor* is a photo-Darlington amplifier.

Means are preferably provided for controlling the air to fuel ratio in accordance with both the speed of rotation of the engine and also the load on the engine.

A fuel injector is preferably associated with a pair of cylinders, the cylinders being arranged in pairs so that the injectors can operate alternately. Each injector has a solenoid for its actuation, this solenoid being fed by the voltage pulses.

In the preferred embodiment, the [source of] *solid state* infra-red [radiation] *lamp* and the [infra-red radiation sensitive element] *photo-transistor* are mounted on a stator member and the wall of a cup-shaped member having at least one slot therein rotates between the [two infra-red elements] *lamp and the photo-transistor* and constitutes the opaque element. Preferably, in the case of a four-cylinder engine, there is a pair of [infra-red radiation sensitive elements] *photo-transistors* mounted 180° with respect to the rotating slot on the cup-shaped rotor member. The slot in the cup-shaped member may have a greater peripheral width at its closed end than at its open end, and the whole cup may be moved longitudinally with respect to the stator member according to the engine speed. The stator member may be mechanically coupled to a diaphragm which is subjected to a difference in pressure between atmospheric and the pressure within the inlet manifold of the engine, so as to be longitudinally movable with respect to the rotor member according to the load on the engine.

The voltage pulses before being fed to the solenoids of the fuel injection system may be fed through an electronic circuit including at least one transistor [amplifier means] and a power transistor which is thereby caused to switch on and off at a fast rate in accordance with the radiation received by the infra-red radiation sensitive element. A separate electronic circuit is preferably provided for each injector.

*BRIEF DESCRIPTION OF THE DRAWINGS*

The present invention will now be described in greater detail, by way of example, with reference to the accompanying drawings, wherein.

*DESCRIPTION OF THE PREFERRED EMBODIMENT*

Figure 1:
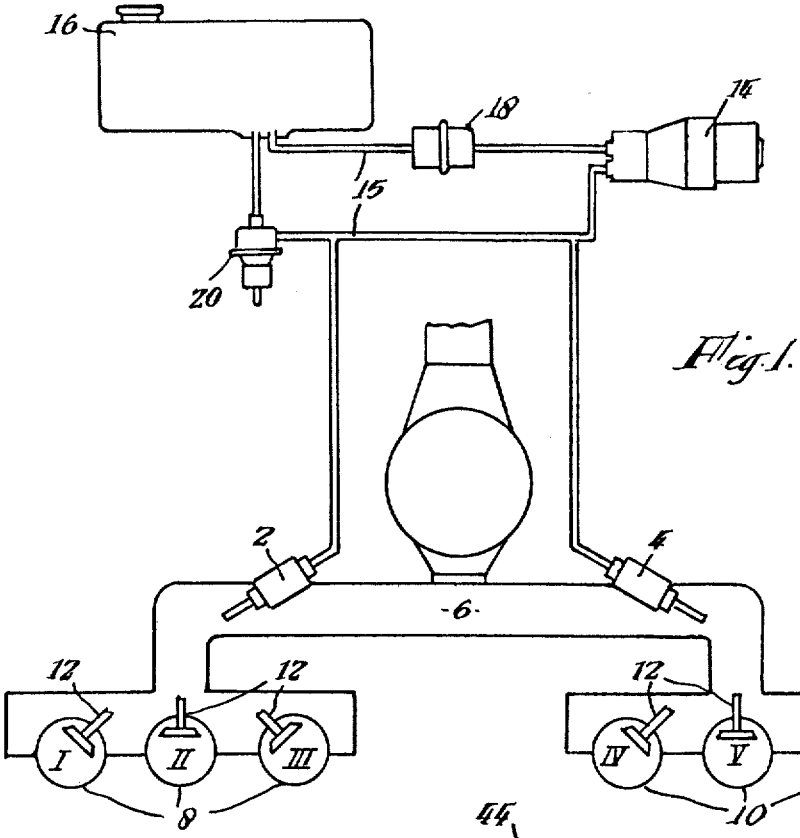
FIG. 1 is a schematic block diagram of the fuel injection system for a six cylinder petrol engine.

Referring first to FIG. 1 of the drawings, the fuel injection system for a petrol engine includes a pair of solenoid operated injectors 2 and 4 mounted in the air induction manifold 6. Each injector 2 or 4 supplies a group of three cylinders 8 or 10 respectively with a fuel/air mixture suitable for combustion through the appropriate inlet valves 12. The timing of the opening of each injector relative to the opening of the inlet valve is timed off the camshaft of the engine, the appropriate voltage pulse for the energization of the solenoid of the fuel injector being generated by the device shown in FIG. 2. The fuel injection system also includes a pump 14 which supplies fuel to the injectors from a fuel circuit 15 including a fuel tank 16, a filter 18 and a pressure regulator 20.

Figure 2:
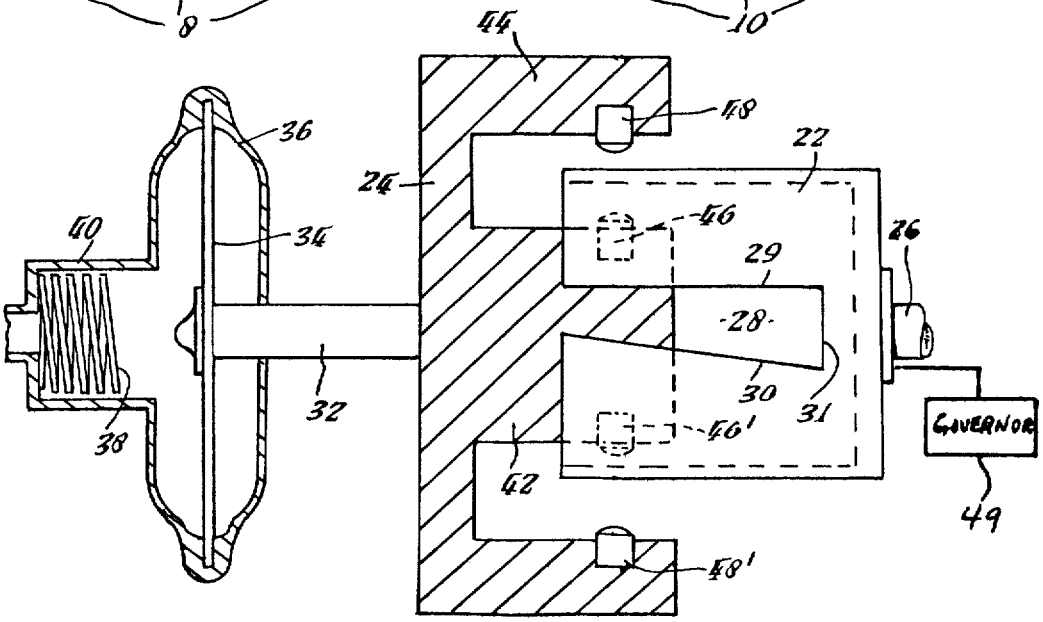
FIG. 2 is a diagrammatic view partly in section of a preferred form of device for generating a voltage pulse.

Referring now to FIG. 2, the device for generating the voltage pulse to energize the solenoids of the fuel injectors includes a cup-shaped rotor member 22 and a cooperating stator member 24, whose cross-sectional shape, as shown, is in the form of a letter E, the cup-shaped member having an internal diameter which is greater than the diameter of the cylindrical central section of the stator member 24. Both members are displaceable independently relative to one another. The cup-shaped rotor member 22 is slidably mounted on a splined shaft 26 which is driven by the camshaft of the engine. The cup-shaped rotor member 22 has a slot 28 cut therein, said slot having one edge 29 which is parallel to the axis of the shaft 26 and a second edge 30 which is inclined at a slight angle to the edge 29 around the peripheral surface of the cylindrical cup, so that the circumferential angle subtended by the slot is greater at its base 31 than at the open end. The stator member 24 is connected to a shaft 32, the other end of which is secured to a diaphragm 34 houses within a chamber 36. The diaphragm 34 divides the chamber in half, one half of which is open to the atmosphere where the shaft 32 passes thereinto, whilst the other half is connected to the induction manifold 6 of the system, so that the pressure on the diaphragm 34 is equal to the difference in pressure between the partial vacuum within the manifold and the atmospheric pressure. A compression spring 38 is positioned in an extension 40 to the chamber 36, the ends of which respectively engages the end of the extension 40 and one face of the diaphragm 34. The spring 38 restores the diaphragm 34 to its normal position when there is no difference in pressure thereacross.

The stator member 24 comprises a cylindrical central part 42 which is free to move within the cup-shaped rotor member 22 and an annular wall 44 which concentrically surrounds the cylindrical central part 42. The central cylindrical part 42 houses a pair of gallium arsenide lamps 46 and 46' arranged in opposition to one another around the periphery of the central part 42. Instead of using gallium arsenide lamps, any other form of *solid state* lamp emitting infra-red radiation, such as a $\beta$-lamp may be used. The annular wall 44 houses a pair of silicon planar photo-transistors 48 and 48' arranged in opposition to one another around the inner periphery of the annular wall 44, the components of each pair facing one another across the gap between the central part 42 and the annular wall 44.

In one preferred embodiment, the photo-transistors 48 and 48' photo Darlington amplifiers.

The cup-shaped rotor member 22 which is driven from the camshaft of the engine is mounted on the splined shaft 26 and is mechanically connected to *a suitable conventional* governor means [(not shown) so as to be longitudinally displaceable] on the shaft 26 [according] *in response* to the speed of the engine. As shown in FIG. 2, the cup-shaped rotor member 22 moves to the left with increasing speed and to the right with decreasing speed. Thus, with increasing speed the photo-transistors 48 and 48' are exposed to the radiation of the respective gallium arsenide lamps for a greater percentage of the camshaft revolution. The stator member 24 is also longitudinally displaceable with respect to the rotor member 22, by means of the diaphragm 34 which is subject to the difference in pressure between atmosphere and the pressure prevailing within the inlet manifold. Thus, with high manifold vacuum the diaphragm 34 is sucked in towards the inlet manifold against the action of the restoring spring 38 which causes the stator member to move to the left as shown in FIG. 2. This has the effect of decreasing the injection duration. Conversely, under low manifold vacuum conditions, the stator member moves to the right, thus increasing the arc during which the photo-transistors remain illuminated by the gallium arsenide lamps, and thus increasing the injection duration.

Figure 3:
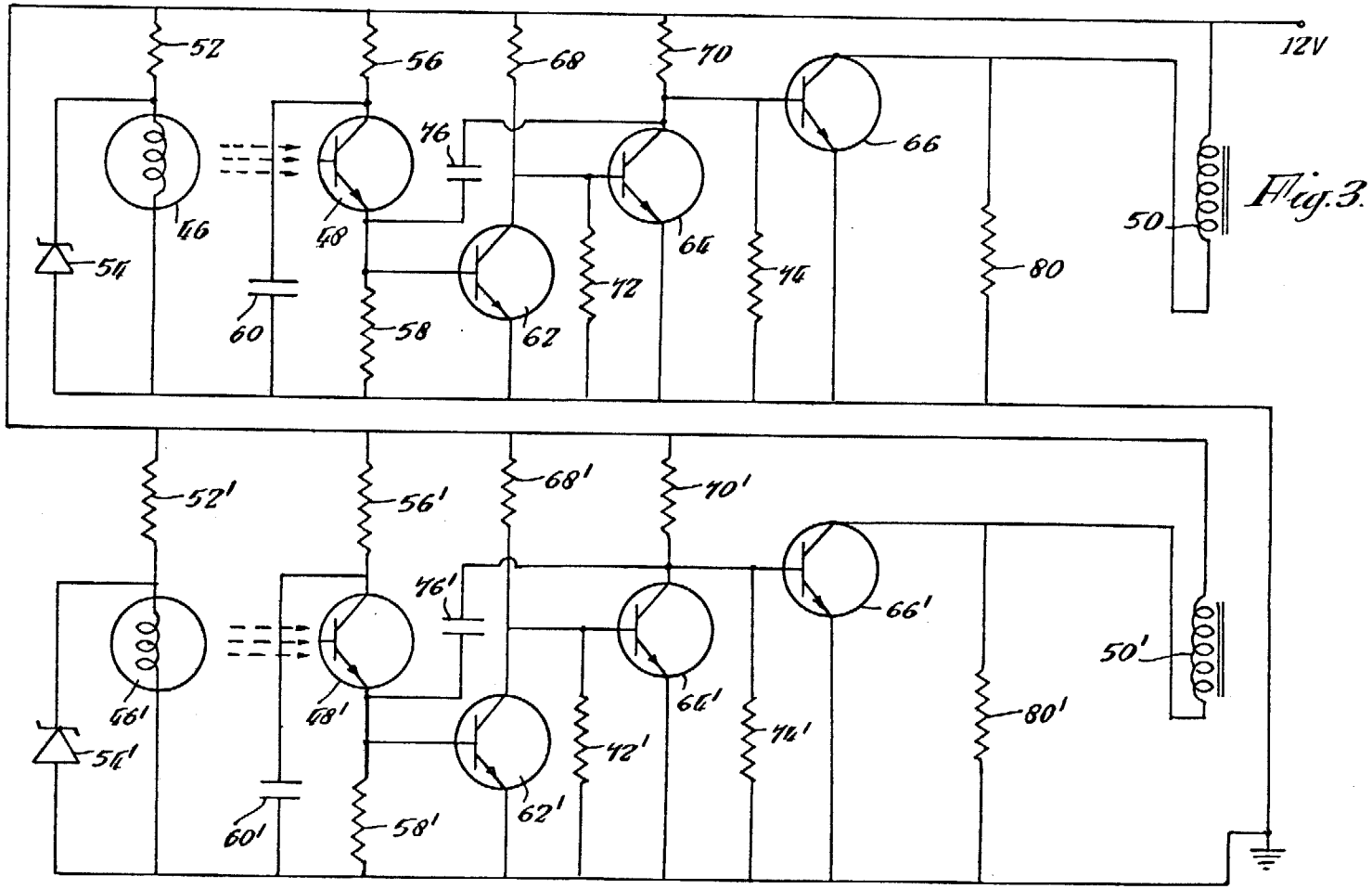
FIG. 3 is a circuit diagram showing the utilization of the voltage pulses to operate the fuel injection system shown in FIG. 1.

The electronic part of the system is shown in FIG. 3, and includes the gallium arsenide lamps 46 and 46', the photo-transistors 48 and 48' and solenoids 50 and 50' of respective fuel injectors 2 and 4. The electronic system for each injector is entirely separate except that they are both energized by the 12 volt battery supply, the components in each part being identical. Resistors 52 and 52' are connected in series with the respective gallium arsenide lamps 46 and 46' across the 12 volt supply, and the voltage across the lamps is stabilized by means of zener diodes 54 and 54'. Resistors 56, 56', 58 and 58' are in the emitter-collector paths of the respective photo-transistors 48 and 48' also across the 12 volt battery supply. As stated above, the photo-transistors 48 and 48' are energized from the gallium arsenide lamps 46 and 46' when infra-red radiation passes through the slot 28 in the cup-shaped rotor member 22. Capacitors 60 and 60' are connected between the collector electrode of the respective photo-transistors 48 and 48' and [earth] *ground*, so as to stabilize the voltage and prevent oscillations occurring thereacross.

The circuit further includes pairs of [transistor amplifiers] *switching transistors* 62, 64 and 62', 64', and high voltage power transistors 66 and 66'. Resistors 68, 68' and 70 and 70' are in collector paths of the respective transistors 62, 62', 64 and 64'. Resistors 72, 72', 74 and 74' are connected between the base electrodes of the respective transistors 64, 64', 66 and 66' and the 12 volt supply. Capacitors 76 and 76' are connected between the emitter electrode of the respective photo-transistors 48 and 48' and the base electrode of the respective power transistors 66 and 66' to provide some positive feed-back to assist switching under all conditions. The output from the photo-transistors 48 and 48' is applied to the base electrode of the transistors 62 and 62' whose output in turn is applied to the base electrodes of the transistors 64 and 64'. From the foregoing and in view of the showing at FIG. 3, it will be appreciated that the transistors 62 and 62' will switch in inverse relation to the transistors 64 and 64', that is, when transistors 62 and 62' are "on", transistors 64 and 64' will be "off", and vice versa. The output from these latter transistors is applied to the power transistors 66 and 66', whose output passes through the respective solenoid windings 50 and 50'. Again it will be understood that power transistors 66 and 66' will switch in inverse relation to the transistors 64 and 64'. Hence, with photo-transistors 48 and 48' "on" and, consequently, with transistors 62 and 62' "on", transistors 64 and 64' will be "off" and power transistors 66 and 66' will be "on". Resistors 80 and 80' reduce the induced voltage applied to the power transistor on switching.

*As will be clear from the above description, the transistors 62, 64 and 66 switch in inverse relation to one another between a fully saturated condition and a fully non-conductive condition. Therefore, at any instant there is always at least one transistor which is conducting, and any high voltage transients on the line are safely conducted to ground through the conducting transistor, thereby preventing the non-conductive transistors from being damaged or broken down.*

The solenoid 50 of the injector 2 is controlled by means of the photo-transistor 48 and likewise the solenoid of the injector 4 is controlled by means of the photo-transistor 48'. The injectors 2 and 4 are each associated with a group of three cylinders in the engine. Since the photo-transistors 48 and 48' are energized alternately on rotation of the rotor 22, the injectors 2 and 4 operate alternately. The normal sequence of firing in a six cylinder internal combustion engine is I-V-III-VI-II-IV and in order that the injectors can operate alternately, the first injector 2 is associated with cylinder Nos. I, II and III and the second injector 4 is associated with cylinder Nos. IV, V and VI as indicated diagrammatically in FIG. 1.

The operation of the above described fuel injection system for a six cylinder petrol engine is as follows. On rotation of the camshaft, the photo-transistors 48 and 48' are alternately illuminated by infra-red radiation as the edge 29 of the slot 28 uncovers their respective gallium arsenide lamps 46 and 46'. Conduction of the respective photo-transistors 48 and 48' [is amplified by means of the associated transistors 62, 62', 64 and 64' to open the respective power transistors 66 and 66'] *causes the associated transistor 62 or 62' to become conductive, the transistor 64 or 64' to become non-conductive and the power transistor 66 or 66' to become conductive.* Conduction of [these] *the* transistors *66 and 66'* energizes the respective solenoids in alternate sequence to operate the respective injectors 2 and 4. When the edge 30 of the slot 28 alternately recovers the infra-red radiation sources, the photo-transistors 48 and 48' cease to conduct immediately and the respective power transistors 66 and 66' are switched off through the inverse switching of the transistors 62, 62' and 64, 64', to de-energize the solenoids 50 and 50' of the injectors 2 and 4. The amount of fuel injected into each cylinder depends on the arc of the circle during which the associated photo-transistor is exposed to infra-red radiation, or in other words, the peripheral width of the slot 28 at the point which intersects the radiation path between the infra-red source and the photo-transistor. The air to fuel ratio is made richer whenever the peripheral width of the radiation window is increased and it is made leaner whenever the width of the radiation window is decreased. As explained above, this may be caused by the longitudinal movement of the rotor 22 with respect to the stator 24, or the longitudinal movement of the stator 24 with respect to the rotor 22, or a combined movement of both members.

Whilst the above system has been described with reference to a six cylinder petrol engine, it is equally applicable to any other type of engine, such as [a] 4, 8 or 12 cylinder [engine] *engines*The cylinders may be paired or otherwise grouped so as to reduce the number of injectors and electronic systems required. For example, in the case of a four cylinder engine, the cylinders may be paired in accordance with the Bosch ECGI-system previously referred to.

Also, whilst the above system has been specifically described with reference to a petrol engine, it is equally applicable to diesel engines.

What I claim and desire to secure by Letters Patent is:

1. A device for fast switching the solenoid of a fuel injector system of an internal combustion engine, including a photo-transistor sensitive to infra-red radiation which will switch on or conduct when exposed to the radiation and switch off when the radiation is cut off; a gallium arsenide lamp emitting infra-red radiation; an element which is opaque to infra-red radiation positioned between the gallium arsenide lamp and the photo-transistor, said opaque element having at least one aperture therein; means for moving the opaque element in timed relation to the engine revolutions; an amplifier having first and second transistors connected in cascade to the output of the photo-transistor and arranged to switch in inverse relation to one another so that any one time a transistor is always conducting; and a power transistor connected to the output of the amplifier to be switched in inverse relation to the second transistor and connected in circuit relationship with the solenoid such that every time a beam of radiation falls onto and is cut off from the photo-transistor, said transistorized amplifier circuit and power transistor causes the fast switching of the solenoid to inject the desired quantity of fuel into a cylinder of the internal combustion engine in accordance with the period during which the photo-transistor is exposed to infra-red radiation.

2. A device according to claim 1, including a stator member having an annular groove; a cup shaped rotor member constituting the opaque element and rotatable within said annular groove in synchronism with the engine, the photo-transistor and gallium arsenide lamp being mounted on the stator member on opposite sides of the annular groove; at least one open-ended slot provided in the cylindrical wall of the rotor member, said slot having a peripheral width which varies in a linear manner from a small peripheral width at the open end to a greater peripheral width at the closed end; and means for axially displacing the rotor with respect to the stator member in accordance with engine speed, the peripheral width of the radiation window as defined by the slot being used to control the air to fuel ratio injected into the engine.

3. A device according to claim 2, including a diaphragm to which the stator member is mechanically coupled, said diaphragm being open to the atmosphere on one side; and an inlet manifold of the engine, the other side of the diaphragm being in communication with the pressure prevailing in the manifold, so that the diaphragm is subjected to a difference in pressure, whereby the stator member is longitudinally moved in relation to the rotor member according to the load on the engine, the peripheral width of the slot being used to control the air to fuel ratio injected into the engine.

4. A device according to claim 1, including as many fuel injectors as there are cylinders in the engine, every fuel injector being associated with a different cylinder; and as many transistorized circuits as there are fuel injectors, these circuits being arranged in parallel to energize the individual solenoids of the fuel injectors, the injectors being operated in cyclic manner according to the cylinder firing sequence of the engine.

5. A device according to claim 2, including n fuel injectors for an internal combustion engine having m cylinders, the cylinders being arranged in groups, there being at least two cylinders in each group; n gallium arsenide lamps and n photo-transistors, the components of each pair being arranged opposite each other across the annular groove of the stator member, each pair being in equi-spaced relation therearound, so that the injectors operate in a given repeatable sequence.

6. A device according to claim 2, including n fuel injectors for an internal combustion engine having 3n cylinders; n gallium arsenide lamps and n photo-transistors, the components of each pair being opposite each other across the annular groove of the stator member, each pair being arranged so that all the pairs are equi-spaced from their neighbors around the stator, the cylinders being arranged in groups of three such that the injectors operate in a given repeatable sequence.

7. A device according to claim 1, wherein the photo-transistor has its base electrode left unconnected, the emitter electrode of the photo-transistor being connected to the base electrode of the first transistor, the collector electrode of the first transistor being connected to the base electrode of the second transistor, the collector electrode of the second transistor being connected to the base electrode of the power transistor, the emitter electrodes of the transistors being commoned and connected to one side of a battery, the collector electrodes being connected to the other side of the battery each through a resistor, and the base electrodes being connected to the commoned emitter electrodes each through further resistors.

8. A device according to claim 7, wherein a resistor is connected in series and a zener diode is connected in parallel with the gallium arsenide lamp.

*9. An opto-electronic device for fast switching the solenoid of a fuel injector system of an internal combustion engine including a photo-transistor sensitive to infra-red radiation which will switch on or conduct when exposed to the radiation and switch off when the radiation is cut off; a solid state infra-red lamp; an element positioned between the solid state lamp and the photo-transistor and having one portion which is opaque to the radiation and another portion through which the radiation can pass; means for moving the element in timed relation to the engine revolutions; and a switching circuit interconnecting the solenoid and the photo-transistor including a plurality of transistors interconnected in a manner so that the output of one is connected to the input of the next and so as to switch on and off in inverse relation to one another, the first of the transistors being connected to the output of the photo-transistor and the last of the transistors being connected to the solenoid whereby the transistors, in response to switching of the photo-transistor, switch between on and off conditions and cause alternate energization and de-energization of the solenoid to thereby inject the desired quantity of fuel into a cylinder of the internal combustion engine.*

*10. A device according to claim 9 including a stator member having an annular groove; a cup shaped rotor member constituting the element and rotatable within said annular groove in synchronism with the engine, the photo-transistor and solid state infra-red lamp being mounted on the stator member on opposite sides of the annular groove; at least one open-ended slot in the cylindrical wall of the rotor defining a radiation window through which radiation from the infra-red lamp can pass, the slot having a peripheral width which varies in a linear manner from a small peripheral width at the open end to a greater peripheral width at the closed end; and means for axially displacing the rotor with respect to the stator member in response to*

*engine speed whereby the peripheral width of the radiation window controls the air to fuel ratio injected into the engine.*

*11. A device according to claim 10 wherein said means for axially displacing the rotor includes a diaphragm mechanically coupled to the stator, one side of the diaphragm connected in communication with the atmosphere and the other side of the diaphragm connected in communication with the pressure prevailing in an inlet manifold of the engine whereby the stator member, in response to the pressure differential existing across the diaphragm indicative of the load on the engine, is moved longitudinally relative to the rotor member.*

*12. A device according to claim 9 including an individual injector for each cylinder in the engine; a switching circuit associated with each fuel injector and arranged to energize the respective fuel injector solenoid whereby the fuel injectors are operated in a cyclic manner according to the cylinder firing sequence of the engine.*

*13. A device according to claim 10 including n fuel injectors for an internal combustion engine having m cylinders arranged in groups, each group having at least two cylinders; n solid state infra-red lamps; and n photo-transistors, each pair of lamps and photo-transistors oppositely disposed across the annular groove of the stator member and circumferentially spaced relative to each other pair at equal intervals around the stator, the cylinders being arranged in groups, such that the injectors operate in a given repeatable sequence.*

*14. A device according to claim 10 including n fuel injectors for an internal combustion engine having 3n cylinders arranged in groups of three; n gallium arsenide solid state infra-red lamps; and n photo-transistors, each pair of lamps and photo-transistors oppositely disposed across the annular groove of the stator member and circumferentially spaced relative to each other pair at equal intervals around the stator, the cylinders being arranged in groups of three, such that the injectors operate in a given repeatable sequence.*

*15. A device according to claim 9 wherein the switching circuit includes three transistors, the base electrode of the photo-transistor is unconnected, the emitter electrode of the photo-transistor is connected to the base electrode of the first transistor, the collector electrode of the first transistor is connected to the base electrode of the second transistor, the collector electrode of the second transistor is connected to the base electrode of the third transistor, the emitter electrodes of the three transistors are commoned and connected to one side of a battery, each of the collector electrodes of the first and second transistors is connected to the other side of the battery through a resistor, and each of the base electrodes of the three transistors is connected to the commoned emitter electrodes through a further resistor.*

*16. A device according to claim 15 including a resistor connected in series and a zener diode connected in parallel with the gallium arsenide solid state infra-red lamp.*

*17. A device according to claim 9 wherein said solid state infra-red lamp is a gallium arsenide lamp.*

*18. A device according to claim 9 wherein said solid state infra-red lamp is a β-lamp.*

*19. An opto-electronic device for fast switching the solenoid of a fuel injector system of an internal combustion engine, including a photo-transistor sensitive to infra-red radiation which will conduct when exposed to infra-red radiation and revert to its non-conductive state when the infra-red radiation is cut off; a gallium arsenide lamp which will emit radiation in the infra-red region of the electro-magnetic spectrum when energized; an element made of a material opaque to the infra-red radiation emitted by the lamp positioned between the lamp and the photo-transistor being said element having at least one aperture through which infra-red radiation can pass; means for rotating said element in timed relation to the engine revolutions; and a switching circuit interconnecting the solenoid and the photo-transistor including a plurality of transistors interconnected in a manner so that the output of one is connected to the input of the next and so as to switch on and off in inverse relationship to one another, the first of the transistors is connected to the output of the photo-transistor and the last of the transistors is connected to the solenoid, whereby the transistors, in response to switching of the photo-transistor, switch between on and off conditions causing de-energization of the solenoid during the time period infra-radiation is cut off from the photo-transistor and causing energization of the solenoid during the time period the photo-transistor is exposed to infra-red radiation to thereby inject the desired quantity of fuel into a cylinder of the internal combustion engine.*

*20. A device according to claim 19 wherein the switching circuit includes three transistors having commoned emitter electrodes and the last of the transistors is a power transistor.*

* * * * *